United States Patent [19]

Del Rosario

[11] Patent Number: 5,035,950

[45] Date of Patent: Jul. 30, 1991

[54] FLUOROELASTOMER COATED FUSER ROLL

[75] Inventor: Chris Del Rosario, Demarest, N.J.

[73] Assignee: Ames Rubber Corporation, Hamburg, N.J.

[21] Appl. No.: 478,074

[22] Filed: Feb. 9, 1990

[51] Int. Cl.[5] .......................... B32B 27/08; B32B 15/08

[52] U.S. Cl. .......................... 428/421; 219/216; 428/447; 428/448; 428/457; 428/906

[58] Field of Search .......................... 430/98, 99, 124; 355/284; 219/216; 428/421, 457, 447, 448, 906

[56] References Cited

U.S. PATENT DOCUMENTS

| | | | |
|---|---|---|---|
| 4,257,699 | 3/1981 | Lentz | 430/99 X |
| 4,264,181 | 4/1981 | Lentz et al. | 355/284 |
| 4,272,179 | 6/1981 | Seanor | 219/216 X |
| 4,763,158 | 8/1988 | Schlueter et al. | 430/99 X |
| 4,853,737 | 8/1989 | Hartley et al. | 430/99 X |
| 4,935,785 | 6/1990 | Wildi et al. | 430/124 X |

*Primary Examiner*—Thomas J. Herbert, Jr.
*Attorney, Agent, or Firm*—Blum Kaplan

[57] ABSTRACT

A fuser member for applying heat and pressure to fuse toner to a recording medium which does not require use of mercapto functional release agents has a surface of a fluoroelastomer material including vinylidene fluoride and at least about 23.4 mole percent hexafluoropropylene. High hexafluoropropylene molar content at least as high as about 30.0 mole percent and preferably 38.1 mole percent may be utilized. When the fluoroelastomer material is a copolymer of vinylidene fluoride and hexafluoropropylene, the fluorine content is between about 69-71%. Such fuser members may be utilized alone or with polysiloxane release agents which do not include mercapto functional compounds.

15 Claims, 1 Drawing Sheet

FIG. 1
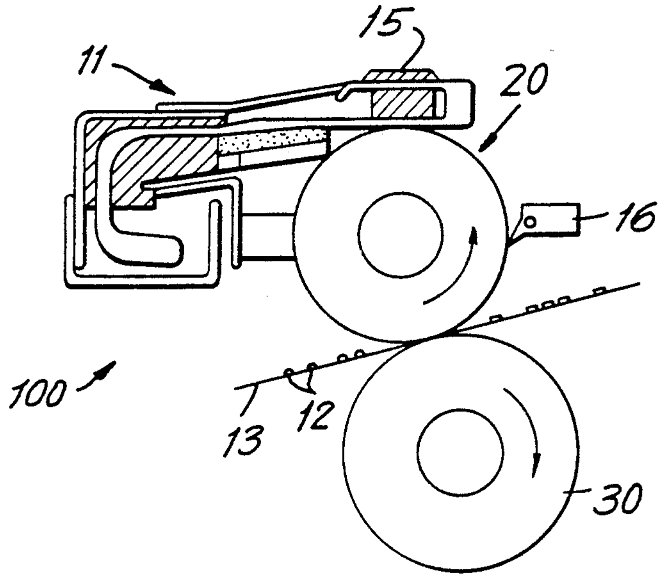
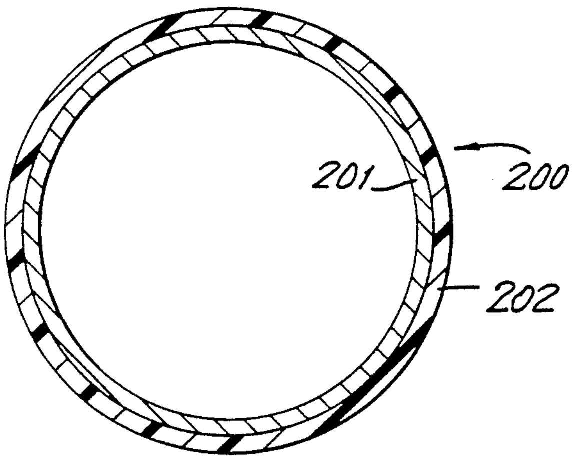
FIG. 2
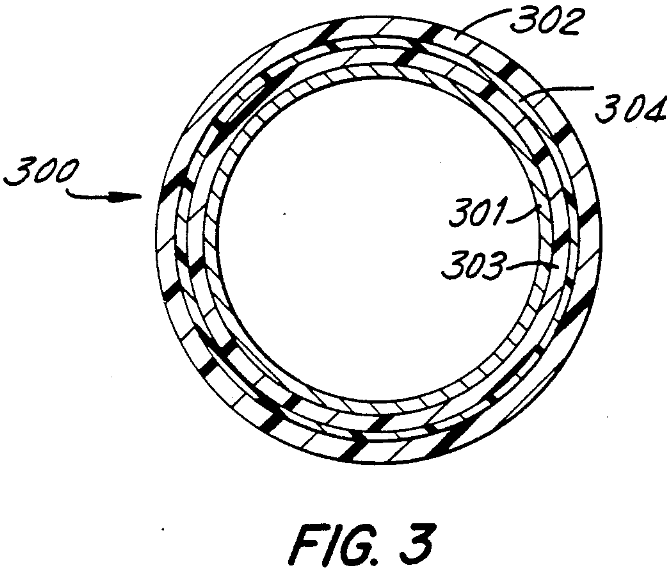
FIG. 3

FLUOROELASTOMER COATED FUSER ROLL

BACKGROUND OF THE INVENTION

The invention relates generally to a heat fusing member and more particularly to a fuser roll having a fluoroelastomer surface for applying heat and pressure to fix toner to recording paper. The fluoroelastomer surface permits toners to be fixed to the recording paper without offset and can withstand continuous exposure to high temperature, silicone oils, toners, toner additives and paper product residue without unacceptable physical degradation.

In general, when forming images by xerographic processes, an image formed of a heat fusible powdered toner is selectively disposed on a web-like surface of a recording medium, such as paper by electrostatic forces. The toner is fixed to the paper by applying heat and pressure by a fuser member such as a heated roller during a fusing process. The toner powders are commonly a mixture of thermoplastic and thermosetting resins having amorphous carbon and magnetic particles incorporated therein and are conventionally fused by direct contact with a fuser roll to temperatures between about 200 to 400° F.

The actual temperature range suitable is referred to as the "fusing window." Fusing window, $TW = T_{off} - T_{min}$, wherein $T_{off}$ is the Hot Offset temperature and $T_{min}$ is the minimum fusing temperature. Hot Offset is the temperature at which coercive forces within the molten toner layer are less than the adhesive forces between the toner and roller surface. $T_{min}$ is the minimum temperature at which toner can be acceptably fixed to the recording paper. This temperature range is dependent on the roll materials, the type of toner, release agents and the pressure. What is important is that the toner be fixed without "offset" occurring. For commercial application a fusing window of at least 30° F. is utilized in some machines, but the larger the better. Thus, a 60° F. fusing window is ideal and 100° F. is particularly desirable.

The toner image is fused to the recording paper by heating above its softening point and applying pressure to force the softened toner into the interstices of the paper fibers. As thermoplastic resin toner cools, it becomes fixed to the recording paper. Thermosetting resin toners fix to the recording paper by a cross-linking mechanism.

The fusing process is conventionally performed by feeding a recording medium having the toner thereon between the nip where two mated rollers meet. One or both of the rollers are heated internally so that the surface temperature of the rollers will be above the softening point of the resinous carrier of the toner. The recording medium with the toner image thereon is fed between the two rollers which press towards each other to apply direct heat and pressure to the toner image. The amount of pressure and the length of time that the toner is heated determine the degree of fusing.

Conventional fuser roller systems have drawbacks. Softened toner generally has an affinity for the surface of the fuser roll it contacts. When toner adheres to the surface of the fuser roll, it can be unintentionally deposited on an unselected portion of the recording medium during the next rotation of the roller. This phenomenon is referred to as offset.

To prevent offset, a thin coating of a release agent such as a polysiloxane fluid is commonly spread over the surface of the fuser roll which contacts the surface with the toner image. The polysiloxane fluid reduces the surface free energy of the roller surface and decreases the affinity of the toner for the roller. However, the release agent is transferred to the surface of the recording medium during fusing of the image. This can interfere with the ability to write on the surface of the recording medium. Furthermore, polysiloxane fluid causes premature failure of certain types of roll covering materials, because it is absorbed into the surface of the roll covering. This reduces fuser roll wear resistance and causes swelling of the roll covering which can lead to an uneven pressure distribution between the two rollers and non-uniform fusing resulting in poorer printing quality.

Fuser rolls are commonly made with a surface material of one of three classes of materials: polyfluorocarbon resins, polysiloxane elastomer and polyfluorocarbon elastomers. Each of these three classes of materials exhibit certain inadequacies although each have an appropriate level of heat resistance and thermal stability.

Polyfluorocarbon resins have drawbacks because they lack sufficient flexibility and elasticity. This adversely affects copy quality because the surface of the fuser roll is harder than the softened toner and is not deformed by the toner. It therefore can displace the toner image and lead to a non-uniform image loss and reduced image purity.

Polysiloxane elastomers are adequately flexible and elastic and lead to high quality fused images. However, after an unacceptably low number of copies are produced, the self release properties of the roll degrade and offset begins to occur. Using a polysiloxane fluid in connection with polysiloxane elastomer rollers enhances the ability of the rollers to release toner, but shortens the roller life due to silicone oil absorption.

Polyfluorocarbon elastomers commonly have unacceptable toner release properties resulting from their high surface tension of 35-37 nMn. Release agent fluid is necessary. Surface tension values for several fuser roll materials are set forth below in Table I.

TABLE I

Surface Tension of Fuser Roll Materials

| Material | Surface Tension nMn |
|---|---|
| Polyfluorocarbon Resins | |
| Polyhexafluoropropylene (PHFP) | 16.2-17.1 |
| Polytetrafluoroethylene (PTFE) | 18.0-18.5 |
| Polyvinylidene fluoride ($PVF_2$) | 21-22 |
| Polysiloxane Oil | 28-29 |
| Polyfluorocarbon Elastomer | 35-37 |

U.S. Pat. Nos. 4,257,699, No. 4,264,181 and No. 4,272,179 describe various fuser roll constructions designed to solve many of the aforementioned inadequacies. These fuser rolls have a core and at least two elastomer layers disposed on the core. Preferred elastomers are fluoroelastomers containing residual metal compounds with at least the outer elastomer layer including additional metal-containing filler dispersed therein. A polymeric release agent having mercapto functional groups is applied to the surface of the fuser roll. The metal-containing filler in the outer elastomer layer must be present in an amount sufficient to interact with the polymeric release agent upon the working surface of the fuser roll to yield a release "film". This film prevents the thermoplastic resin toner from contacting the elastomer material itself. The film must have surface energy that is less than the surface energy of the toner at operating temperatures. While this construction is satisfactory, it has drawbacks. The silicone fluid having mercapto functional groups polymeric release agents described therein are expensive and interfere with the ability to write on the paper after fusing. They present an unpleasant odor in the office environment, are significantly more expensive and frequently contaminate internal and external surfaces of the copying equipment and the copier office environment.

Accordingly, it is desirable to provide an improved fuser system which overcomes the shortcomings of the conventional fuser systems described above.

SUMMARY OF THE INVENTION

Generally speaking, in accordance with the invention a fuser member for applying heat and pressure to fuse toner to a recording includes a fluoroelastomer material surface which does not require use of mercapto functional release agent compounds to prevent offset. The fluoroelastomer material includes a copolymer of vinylidene fluoride and at least about 23.4 mole percent hexafluoropropylene, preferably at least about 30.0 mole percent and most preferably 38.1 mole percent. When the elastomer is a copolymer, it has a fluorine content of about 69–71%. The fluoroelastomer material can also include curing additives such as hexafluoropropylidene diphenol, triphenol benzyl phosphonium chloride/bromide and acid acceptor. Such a fluoroelastomer material will prevent offset without requiring reaction between metal oxides included in the fluoroelastomer and mercapto functional polysiloxane release agent and can be stably used alone or with polysiloxane fluid release agents that do not include mercapto terminated compounds.

Accordingly, it is an object of the invention to provide an improved fuser roll for fixing toner to a recording medium.

Another object of the invention is to provide an improved fuser roll that is not subject to degradation from exposure to high temperature, silicone oil, toner, toner additives and paper product residue.

A further object of the invention is to provide a fuser roll system that does not require the interaction between metal oxides and mercapto functional release agent compounds.

Still another object of the invention is to provide a fuser roll that will fuse toner to paper without interfering with the ability to write on the paper after fusing.

Still other objects and advantages of the invention will in part be obvious and will in part be apparent from the specification and drawings.

The invention accordingly comprises a construction possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic cross-sectional view of a fuser roll test assembly;

FIG. 2 is a cross-sectional view of a single layer fuser roll constructed in accordance with an embodiment of the invention; and FIG. 3 is a cross-sectional view of a multi-layer fuser roll constructed in accordance with another embodiment of the invention.

DESCRIPTION OF THE PREFERRED EMBODIMENTS

A fuser member constructed in accordance with the invention includes a fluoroelastomer material surface. The fuser member can be a belt, a flat surface or another substrate having suitable shape for fixing thermoplastic resin powder images to a recording medium, such as paper, at elevated temperatures under pressure. The fuser member is preferably a roll having a hollow metal core covered with the fluoroelastomer material. A heating element can be included inside the core to heat the fluoroelastomer surface. The fuser roll can be used to fix thermoplastic resin powder images to a recording medium such as paper without offset and without relying on metal oxides/mercapto functional release agent interaction.

Preferred fluoroelastomer material for the fuser roll surface includes a greater molar content of HFP than conventional fluoroelastomer used in fuser rolls. The molar content of HFP is above about 23.4 mole %, preferably above about 30.0 mole %, and most preferably above about 38.1 mole %. A copolymer of vinylidene fluoride ($VF_2$) and hexafluoropropylene (HFP), including more than 69% to about 71% total fluorine by weight. The fluoroelastomer preferably includes more hexafluoropropylene monomer than vinylidene fluoride monomer so that the weight ratio of vinylidene fluoride to hexafluoropropylene ($VF_2$/HFP) is less than about 1.40. Preferably, the $VF_2$/HFP ratio is less than 1.2 and above 0.7 with the most preferred range between about 0.70 and 0.80. The elastomer material can also include cure additives, hexafluoropropylidene diphenol, triphenyl benzyl phosphonium chloride/bromide and acid acceptor. The effectiveness of higher amounts of hexafluoropropylene are believed to relate to the surface energy. Polyhexafluoropropylene has a surface energy of 16.2–17.1 mNm compared to 18.5 mNm for polytetrafluoroethylene and polyvinylidene fluoride.

The compositions of the elastomer surface of two comparison metal oxide filled fuser rolls designated compositions A and B, two metal oxide filled fuser roll surfaces materials designated compositions C and D and a non-metal oxide fluoroelastomer fuser roll surface material designated composition E are set forth below in Table II. The designation "non-metal oxide filled" refers to elastomers containing no more than sufficient residual metal oxide to act as an activator and acid acceptor, which are necessary and conventionally used for crosslinking the composition and insufficient in amount to react with a mercaptofunctional release agent compound to enhance toner release qualities.

TABLE II

| Fuser Roll Surface Material Compositions | | | | | |
|---|---|---|---|---|---|
| | Comparison Metal Oxide Filled | | Metal Oxide Filled | | Non-metal Oxide |
| COMPOSITION | A | B | C | D | E |

TABLE II-continued

| INGREDIENTS | | | | | |
|---|---|---|---|---|---|
| Terpolymer $VF_2$, HFP & TPE | 100 | X | X | X | X |
| Copolymer of $VF_2$ and TPE | X | 100 | X | 100 | X |
| Terpolymer $VF_2$, HFP & TPE & Cure Site Monomer | X | X | 100 | X | X |
| Copolymer $VF_2$ & TPE | X | X | X | X | 100 |
| Cupric Oxide | X | X | 15 | 15 | X |
| Lead Oxide | 15 | 15 | X | X | X |
| Magnesium Oxide | X | X | 2.0 | 3 | 3 |
| Calcium Hydroxide | X | X | 1.0 | 6 | 6 |
| CURATIVE 20 | 2.5 | 1.4 | X | 1.4 | X |
| CURATIVE 30 | 3.5 | 2.8 | X | 2.8 | X |
| CURATIVE 50 | X | X | 5.0 | X | X |
| Polymer Data | Terpolymer of $VF_2$, HFP and TFE | Copolymer of $VF_2$ and HFP | Tetrapolymer of $VF_2$, HFP, TFE and cure site monomer | Copolymer of $VF_2$ and HFP | Copolymer of $VF_2$ and HFP |
| Total Fluorine | 68.5% | 65.9% | 69.0% | 65.9% | 69.6% |
| HFP Content | 31.2 | 38.5 | 35 | 39.5 | 58 |
| $VF_2$ Content | 44.5 | 60.5 | 38 | 60.5 | 42 |
| TFE Content | 24.3 | X | 25 | X | X |
| $VF_2$/HFP Ratio | 1.426 | 1.532 | 1.09 | 1.532 | 0.724 |
| UK: Unknown | | | | | |

| Chemical Composition | Ingredient Data<br>Trade Name | Manufacturer |
|---|---|---|
| Terpolymer of $VF_2$, HFP and TPE with 68.5% fluorine. | VITON B-50, FLUOREL, FT 2430 | DuPont, 3M |
| Copolymer of $VF_2$ and HFP with 65.9% fluorine. | VITON E-45, FLUOREL, FC 2145 | DuPont, 3M |
| Copolymer of $VF_2$ and HFP with 66% fluorine. | VITON E-60, FLUOREL, FC 2230 | DuPont, 3M |
| Tetrapolymer of $VF_2$, HFP, TFE and cure site monomer with 69% fluorine. | VITON GF, FLUOREL FLS 2690 | DuPont, 3M |
| Copolymer of $VF_2$ and HFP containing phosphonium salt accelerator and bisphenol crosslinker with 69.6% fluorine. | FC 2530 | 3M |
| 33% dispersion of organophosphonium salt in Viton E-45. | CURATIVE 20 | DuPont |
| 50% dispersion of bisphenol (dihydroxy aromatic compound) in Viton E-45. | CURATIVE 30 | DuPont |
| Proprietary accelerator and bisphenol curative system. | CURATIVE 50 | DuPont |

The five compositions A–E were prepared by mixing the components with a two roll mixing mill. The polymer was loaded between the two mill rolls to obtain a "bank". Cross-blending was obtained by cutting the sheet off the mill roll until a uniform viscosity was achieved. The powdered ingredients were then added over the polymer bank and dispersed therein by cutting and cross-blending. The curatives are then added and the composition was cut and cross-blended to obtain thorough and uniform dispersion of all ingredients. The resulting material was cooled in the air, compound tested, then used to cover a fuser roller.

The components can also be mixed with an internal mixer known in the trade as a Banbury. When the fuser roller material is formed using a liquid state composition, the composition can be effectively prepared by "in-situ" mixing techniques. In-situ mixing involves dissolving the polymer in a solvent then adding the powdered ingredients including the activator and curatives. In compositions having a tendency to gel rapidly, it is preferable to employ a two or three component system to isolate the calcium hydroxide and/or the accelerator.

Examples of fuser rolls formed in accordance with the invention will be described with reference to the following examples. The examples are presented for purposes of illustration only and are not intended to be construed in a limiting sense.

EXAMPLE 1

FIG. 2 illustrates a portion of a single layer fuser roll 200 including an insert 201 covered with a top coat 202. Roll 200 was prepared by covering a 1.5 inch diameter aluminum core with a 0.020 inch thick top coat of non-metal oxide filled fluoroelastomer E of composition listed in Table II. Sample fuser roll 200 was prepared by mixing the composition listed in Table II in a two roll mill, preforming a sheet and laminating the sheet to the aluminum insert with epoxy adhesive (Thixon 300-301). The sample was placed in a mold and cured for 30 minutes at 350° F. It was post cured in an air circulating oven for up to 24 hours at 450.F. The cured fluoroelastomer surface was subjected to final surface grinding to obtain the desired thickness and diameter of top coat 202.

Fuser roll 200 was installed in a fuser test assembly 100 as shown in FIG. 1 which applies heat and pressure to fuse a quantity of toner particles 12 on a sheet of paper 13 between a fuser roll 20 and a pressure roll 30. Fuser test assembly 100 also includes a release agent application unit 11 including a wick 15 for applying release agent to the surface of fuser roll 20. A stripper finger 16 cleans roll 20 prior to deposition of a release agent at wick 15.

Fusing tests were carried out by passing an 8.5×11.5 inch 75 g/m$^2$ sheet of paper having toner particles thereon between fuser roll 200 and pressure roll 30 to fuse toner 12 to paper 13. The surface temperature of fuser roll 200 was adjusted from a starting surface temperature of 300° F. to a temperature at which hot offset became evident.

Fuser roll tests were conducted both without polysiloxane oil release agent and with polysiloxane oil release agent fluid. The fluid was mercapto functional polysiloxane oil identified as Xerox fuser agent 1065-8200, 8700-V/9210, 9500/9700-V and 9900. The results obtained using the mercapto functional polysiloxane oil were compared to non-mercapto functional polysiloxane oil identified as Dow Corning DC 200. The results are summarized below in Table III.

TABLE III

FUSING TEST DATA
Composition E, Single Layer Non-Metal Oxide Filled Fuser Roll

| Xerox Toner type | Non-wicked | Wicked | |
|---|---|---|---|
| | No Oil | Std. Oil | Mercapto Oil |
| 1055 | X | 300-350° F. | X |
| 2830 | 300-400° F. | X | X |
| 9200 | X | 300-390° F. | 300-380° F. |

The results of the fuser roll test showed that composition E, a non-metal oxide filled composition prepared in accordance with the invention, provided a fusing window of 90° F. with non-mercapto functional fluid and an 80° F. window with mercapto functional polysiloxane fluid. Accordingly, the release of toner particles did not depend on mercapto-metal oxide interaction. When Xerox 2830 toner was employed, a 100° F. window was obtained without using polysiloxane mercapto functional fluid.

EXAMPLE 2

A multi-layer fuser roll 300 of FIG. 3 was also tested. Roll 300 includes an insert 302 covered with a base coat 303 having a tie coat 304 disposed thereon and a top coat 302 on tie coat 304 prepared by covering a 1.5 inch diameter aluminum insert 301 with a 35 mil thick silicone compound base layer 303. A 1-2 mil thick fluoroelastomer compound tie coat was disposed thereon and a 5 mil thick top coat 302 formed of composition E was disposed o tie coat 304. The multi-layer construction can provide greater conformability, thermal conductivity, flexibility in design/part fabrication and lowered product cost. It is preferable to load the silicone base layer with heat conducting filler such as metal oxide powder.

The silicone compound for base layer 303 was prepared by mixing 100 parts silicone base (SE 6035), 200 parts of 5 micron aluminum oxide, 100 parts red pigment (K6270), 4 parts process additive (S880) and 1.5 parts of cure agent (Varox) using a two roll mill. After mixing, aluminum insert 301 was coated with an adhesive (primer 18) and the silicone compound was applied thereon by compression molding in accordance with the procedure set forth in Example 1. The sample was postcured for 4 hours at 400° F. then surface ground. The surface of silicone base layer 303 was washed with solvent and a primer was applied and allowed to dry.

Fluoroelastomer tie coat 304 was applied by spraying a 15% solid solution formed by dissolving the fluoroelastomer compound in a 50:50 blend of methylethyl ketone (MEK) and methylisobutyl ketone (MIBK) solvents onto the primer. The ketone mixture is not critical as it merely affects the solvent drying rate. Top coat 302 of composition E was sprayed onto tie coat 304 to attain a finished 5 mil thickness. Fuser roll 300 was maintained at room temperature for 24 hours and cured in a circulating hot air oven for up to 24 hours at 450° F. Cured fuser roll 300 was subjected to final surface grinding to obtain a desired surface thickness and diameter.

Multi-layer fuser roll 300 was installed in fuser test assembly 100 shown in FIG. 1 and fusing tests were performed as described in Example 1. The test results show that composition E provided a fusing window of 70 to 100° F. with a non-mercapto functional polysiloxane release fluid and 50° F. using the Xerox mercapto functional oil. Accordingly, the ability to release toner did not depend on metal oxide-mercapto interaction. Fuser roll 300 exhibited toner release without use of polysiloxane oil when Xerox toner 2830 was applied to the paper. The test results are summarized below in Table IV.

TABLE IV

Composition "E", Multi-layer Non-Metal Oxide Filled Fuser Roll

| Xerox Toner type | Non-wicked | Wicked | |
|---|---|---|---|
| | No Oil | Std. Oil | Mercapto Oil |
| 1055 | Offset | 300-400° F. | X |
| 2830 | 300-400° F. | X | X |
| 9200 | 300-340° F. | 200-370° F. | 300-350° F. |

EXAMPLE 3

A sample fuser roll was formed by covering a 3 inch diameter aluminum insert with a 4 mil thick fluoroelastomer base coat covered by a 2 mil thick coating of Composition E. The sample fuser roll was prepared by first mixing the base coat material and top coat compound in two roll mixing mills. The base coat compound was formed of 100 parts Viton E60 fluoroelastomer, 30 parts thermal carbon black filler, 12 parts magnesium oxide as an activator/acid acceptor, 5 parts pigment (Ferro V 1106 red) and 5.5 parts blended curatives (curative 20 and 30).

The mixed starting materials were dissolved in a 50:50 blend MIBK and MEK solvents to yield approximately a 15% solid concentration. The aluminum insert was precoated with a (Thixon 300/301) adhesive and sprayed with the base coat solution to a thickness of 5-6 mils. The coated sample was maintained at room temperature to permit residual solvent to evaporate and then cured in a circulating air oven up to 24 hours at 150° F. The sample was ground to a base coat thickness of 4-4.5 mils. After washing the sample with solvent, it was oversprayed with the 15% solid top coat solution to yield a coating having a thickness of 4-4.5 mils. Residual solvent was permitted to evaporate and the sample was subjected to a final curing in a hot air circulating oven for up to 24 hours at 450° C. and the top coat was ground to a thickness of 1.5-2.0 mils.

The sample fuser roll was installed in a Xerox 9500 copier and tested with mercapto terminated polydimethysiloxane oil having an average viscosity of 275 cstks and having a mercapto reactivity of 0.070% and Xerox toner (8200/9210/9500/9900) supplied by Pelican, Inc. A copy test was performed and the roller provided excellent copy quality with no offset. The roll was removed after 350,000 copies were made due to a mechanical damage induced to the roll surface by an operator. The roll surface was examined and there was no evidence of toner build-up or wear. This demonstrated the ability of fluoroelastomer Composition E to provide excellent copies without offset and without dependency on recapto-metal oxide interaction. The top coat composition included no metal oxide filler and includes only residual metal oxide required for cure and activation and insufficient metal oxide to lead to mercapto-metal oxide interaction.

Cure or crosslinking is attained by subjecting the fuser roll materials to a heat source, and this can be accomplished by different processes. Examples are molding using a press with heated plates, open steam vulcanizer where rubber parts are put in a vessel pressurized by introducing steam, hot air oven, microwave, etc. The selection of the cure process is dictated by part shape and rubber thickness. Typically, a thickness of between 0 to 10 mils is sprayed and hot air cured, whereas a thickness over 10 mils is either extruded, steam cured or preformed (molded).

Nucleophic addition cure to crosslink a fluoroelastomer resin is an alternative cure process to free radical polymeritation and is discussed generally in U.S. Pat. No. 4,257,699 at columns 9–11. This route is suitable to cure fluoroelastomer composition E following the same general mechanism discussed therein. Polymer FC 2530 contains bisphenol crosslinking and phosphium salt accelerator agents, known as incorporated cure polymers.

The presence of acid acceptor residue metal oxide (MgO, PbO, CaO, ZnO etc.) is required to attain practical vulcanized properties, particularly with respect to high temperature resistance. The MgO is generally classified as an acid acceptor and the $Ca(OH)_2$ is classified as an activator or co-accelerator. These levels of metal oxide typifies a general purpose system where balance processing and vulcanizate properties are attained. Thus, Composition E contains 3 parts magnesium oxide and 6 parts calcium hydroxide, but no additional metal oxide filler.

After cure or crosslinking, MgO remains unchanged, except that traces of hydrogen fluoride (HF) and water may be absorbed. The significance is that Composition E demonstrates good release properties (no offset) without using a mercapto functional oil compared to Compositions A, B and D.

EXAMPLE 4 (COMPARISON)

A metal-oxide filled multi-layer fuser roll was formed as described in Example 2, except that the top coat composition was a fluoroelastomer Composition A of Table II. A fuser test was performed as described in Example 1 and immediate offset was evident when copying with Xerox toner 1055 when a non-mercapto functional polysiloxane fluid was employed. However, a fusing window of 300 to 400° F. (100° F.) was attained with use of a mercapto functional polysiloxane fuser agent (Xerox 1065/8200, 8700-V/9210, 9500/9700-V, 9900).

TABLE V

FUSING TEST DATA
Metal Oxide Filled Compositions
Composition "A"

| Xerox Toner type | Non-wicked No Oil | Wicked Std. Oil | Wicked Mercapto Oil |
|---|---|---|---|
| 1055 | Offset | X | 300–400° F. |
| 2830 | 300–370° F. | X | 300–400° F. |
| 9200 | 300–330° F. | 300–330° F. | 300–380° F. |

Based on the results, it is concluded that Composition A is dependent on mercapto-metal oxide interaction to prevent offset from occurring. When Xerox 9200 toner was tested with non-mercapto polysiloxane oil, a fusing window of 300 to 330° F. (30° F.) was observed, but when the mercapto functional Xerox fuser agent was employed, the observed fusing window was 300 to 400° F. (100° F.) demonstrating the dependency of composition A on mercapto-metal oxide interaction to prevent offset.

EXAMPLE 5 (COMPARISON)

A sample multi-layer metal-oxide filled fuser roll was prepared as described in Example 2, except that the fluoroelastomer top coat was formed with metal oxide filled fluoroelastomer of Composition B from Table II. The fuser test was performed as described in Example 1. When Xerox toners 1055 and 9200 were used, immediate offset was evident with a non-mercapto functional polysiloxane Xerox fuser agent (1065/8200, 8700-V/9210, 9500/9700-V and 9900). With mercapto oil, the window was 50° F.

Based on these results, it is concluded that proper performance with Composition B top coat is dependent on the mercapto-metal oxide interaction. The test results with composition B are summarized below in Table VI.

TABLE VI

Metal Oxide Filled Compositions
Composition "B"

| Xerox Toner type | Non-wicked No Oil | Wicked Std. Oil | Wicked Mercapto Oil |
|---|---|---|---|
| 1055 | Offset | Offset | 300–350° F. |
| 2830 | Offset | X | X |
| 9200 | Offset | Offset | X |

EXAMPLE 6 (COMPARISON)

A metal oxide filled multi-layer fuser roll was prepared as described in Example 2, except that the fluoroelastomer top coat was of Composition D identified in Table II. The fuser test was performed with Xerox toner 1055 and 9200. Immediate offset occurred when non-mercapto functional polysiloxane fuser agent was used. A fusing window of 300 to 380° F. was attained when a mercapto functional polysiloxane Xerox fuser oil (1065/8200, 8700-V/9210, 9700 and 9900).

Based on these results, it is concluded that proper performance with composition D is dependent on mercapto-metal oxide interaction. The test results with composition D are summarized below in Table VII.

TABLE VII

| Xerox Toner type | Metal Oxide Filled Compositions Composition "D" Non-wicked No Oil | Wicked Std. Oil | Wicked Mercapto Oil |
|---|---|---|---|
| 1055 | Offset | Offset | X |
| 2830 | Offset | Offset | X |
| 9200 | Offset | Offset | 300-380° F. |

EXAMPLE 7

A metal oxide filled multi-layer fuser roller was prepared as described in Example 2, except that the fluoroelastomer top coat material was that of Composition C identified in Table II. The fuser test was performed as described in Example 1 and the test results showed that when Xerox toner Nos. 1055 and 9200 were utilized, a fusing window of 300 to 390° F. and 300 to 380° F. was observed with a non-mercapto functional polysiloxane Xerox fuser oil (1065/8200, 8700-V9210, 9500/9700=V and 9900).

Fluoroelastomer COmposition C, which includes Viton having a 69% fluorine demonstrated a lesser dependency of mercapto-metal oxide interaction to avoid offset than did fluoroelastomer Compositions A and B. It is believed that this lesser dependency is due to the high fluorine content of 69% compared to Viton B-50 and Viton E-45 of Compositions A and B which contain 68% and 66% fluorine, respectively. The results of the tests with composition C are summarized below in Table VIII.

TABLE VIII

| Xerox Toner Type | Metal Oxide Filled Compositions Composition "C" Non-wicked No Oil | Wicked Std. Oil | Wicked Mercapto Oil |
|---|---|---|---|
| 1055 | Offset | 300-390° F. | 300-400° F. |
| 2830 | 300-400° F. | 300-400° F. | X |
| 9200 | Offset | 300-380° F. | X |

EXAMPLE 8

A fuser roll was prepared by coating a 1.5 inch diameter aluminum insert with adhesive (Chemlok 608) and covering the aluminum insert with a 0.020 inch thick silicone compound (SWS 832) in a tubular steel mold. Steel spiders were used to center the coated insert. The silicone compound was prepared by mixing 100 parts SWS 832 and 10 parts of a cure agent (KL catalyst). This mixture was mixed with an air driven stirrer and degassed in a vacuum for 5 minutes to remove entrapped gases. The mixture was pumped into the mold-insert assembly and subjected to cross-linking by heating the assembly in a hot air circulating oven for 1.5 hours at 212° F. followed by post curing for 4 hours at 400° F.

The fuser roll was tested on assembly 100 both with and without the use of non-mercapto functional polysiloxane oil. When the polysiloxane oil was not used, the silicone compound demonstrated a fusing window of 300 to 330° F. with Xerox toner 9200; immediate offset with Xerox toner 1055 and a fusing window of 300 to 400° F. with Xerox toner 2830 which contains release additive. When the polysiloxane release agent was used, the SWS 832 compound exhibited a fusing window of 300 to 400° F. with Xerox toner Nos. 1055, 2830 and 9200 demonstrating a lack of dependency on mercapto-metal oxide interaction to prevent offset and showed a high degree of compatibility with polysiloxane oil.

When the silicone composition is continuously exposed to polysiloxane oil, it tends to swell and it detrimentally changes the fusing characteristics of the fuser roll. However, fluoroelastomer compositions are typically essentially inert to polysiloxane oil and the fusing performance will remain unchanged. Accordingly, a top coat of fluoroelastomer Composition E demonstrated acceptable wetting properties with respect to polysiloxane oil and is impervious thereto. Thus, it should provide consistent long copier life and is not dependent on the mercapto-metal oxide interaction.

EXAMPLE 9

A fuser roll was prepared as described in Example 8, except that the covering material was LIM 2700, a silicone class of material which differs from SWS 832 in that it has a different type of filler, molecular weight of polysiloxane and type of crosslinking mechanism. SWS 832 is a condensation cure formed by a silanol-alkoxy condensation reaction in the presence of a stannous soap catalyst with an alcohol reaction by-product. LIM 2700 is an addition cure vinyl group-hydride mechanism in the presence of platinum salt catalyst provides no reaction by-products. Test results are summarized below in Table IX.

Early studies suggest that condensation reaction systems provide better release properties than do addition reaction systems. Fusing tests supported this early finding wherein samples showed immediate offset with Xerox toners 1055, 2830 and 9200 in a non-polysiloxane aided test matrix. The significance lies in comparing LIM 2700 samples to non-metal filled fluoroelastomer compositions in which the silicone compound will be degraded by the polysiloxane oil whereas the fluoroelastomer will be adequately wetted by the polysiloxane oil but will remain impervious to the oil.

EXAMPLE 10

A fuser roll was prepared by coating a 1.5 inch diameter aluminum insert with a silicone compound as described in Example 8 and covering the coating with a 0.010 inch thick layer of PFA tubing. The PFA tubing was laminated over the silicone coated insert by inserting the silicone coated insert into the tubing and heating the assembly to 600° F. to heat shrink the tubing around the silicone coated insert.

A fusing test as described above was performed without the use of non-mercapto polysiloxane release agents. The test demonstrated a fusing window of 300 to 340° F., but only after the surface of the PFA roll was sanded and when Xerox 2830 toner which includes release additive was used. During the polysiloxane aided test, a fusing window of 300 to 400° F. was attained. Accordingly, the non-metal filled fluoroelastomer composition is equivalent to fluorocarbon resin in its ability to be wetted by polysiloxane oil and provide offset free release properties while additionally providing conformability and therefore, improved copy quality. Test results of the PFA sleeve are summarized below in Table X.

TABLE X

| | FLUOROCARBON RESIN (PFA Sleeve) | | | |
|---|---|---|---|---|
| | Smooth Finished | | Ground | |
| Toner | Wicked | Non-wicked | Wicked | Non-wicked |
| 1055 | 300-400 | Offset | 300-400 | Offset ? |
| 2830 | 300-400 | Offset | 300-400 | 300-340 |
| 9200 | 300-400 | Offset | 300-400 | Offset ? |

A fuser member having a surface composition including a fluoroelastomer containing 69 to 71% total fluorine such as FX 2530 from the 3M company can allow thermoplastic and thermoset toner powders to be fixed to a substrate with acceptable or satisfactory fusing latitude and without dependency on metal-metaloxide interaction with the mercapto functional group of polysiloxane release agent. The ability of the composition to prevent offset is believed to be depend on the high total fluorine content and higher hexafluoropropylene monomer content and the resultant vinylidene fluoride-hexafluoropropylene ratio that allows the surface of the composition to be wetted and maintained as an effective, impervious low surface energy PDMS release layer by standard non-reactive polysiloxane release agents.

Such a fluoroelastomer composition has appropriate elasticity and has a Shore "A" hardness of 55 to 65 compared with fluorocarbon resin which as a Shore "D" hardness of 40 to 80. 1 to 5 mil thick coatings provide particularly desirable conformability characteristics which result in improved copy quality. The fuser roll construction in accordance with the invention is also advantageous due to the compositions ability to be bonded to a metal substrate with either epoxy or silane based adhesives.

It will thus be seen that the objects set forth above, among those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A fuser member to fix toner particles on a recording medium, comprising:

a substrate; and a top coat on the substrate, the top coat of a fluoroelastomer including vinylidene fluoride and at least about 23.4 mole percent hexafluoropropylene.

2. The fuser member of claim 1, wherein the fluoroelastomer includes at least about 30.0 mole percent hexafluoropropylene.

3. The fuser member of claim 1, wherein the fluoroelastomer includes at least about 38.1 mole percent hexafluoropropylene.

4. The fuser member of claim 1, wherein the fluoroelastomer is a copolymer of hexafluoropropylene and vinylidene fluoride.

5. The fuser member of claim 4, wherein the weight ratio of vinylidene fluoride to hexafluoropropylene is less than 1.0.

6. The fuser member of claim 4, wherein the ratio is between about 0.70 and 0.80.

7. The fuser member of claim 1, wherein the fuser member is in the form of a roll and the fluoroelastomer is the outer covering of the roll.

8. The fuser member of claim 7, wherein the substrate is in the form of a metal core having a layer of silicone material including metal oxide filler, disposed thereon.

9. The fuser member of claim 8, and including a tie coat of fluoroelastomer disposed between the top coat and the substrate.

10. The fuser member of claim 1, wherein the fluoroelastomer is cured by a nucleophic addition cure.

11. The fuser member of claim 10, wherein the nucleophilic addition cure utilized MgO as an acceptor and $Ca(OH)_2$ as activator.

12. The fuser member of claim 11, wherein MgO is included in an amount between about 2 to 4 parts and $Ca(OH)_2$ in an amount between about 4 to 8 parts, per 100 parts by weight of elastomer.

13. The fuser member of claim 11, wherein the fluoroelastomer includes less than about 10 parts metal oxide per 100 parts elastomer.

14. A fuser system for fusing toner to a recording medium, comprising:

a substrate;

a top coat formed of a fluoroelastomer material disposed on the substrate, the fluoroelastomer material including vinylidene fluoride and at least about 23.4 mole percent hexafluoropropylene; and a polysiloxane release agent fluid disposed on the surface of the top coat.

15. The fuser system of claim 14, wherein the release agent fluid is substantially free of mercapto functional compounds.

* * * * *